G. H. ALLEN.
GENERATOR FOR GAS PRODUCER PLANTS.
APPLICATION FILED JULY 27, 1915.

1,254,107.

Patented Jan. 22, 1918.
2 SHEETS—SHEET 2.

Inventor.
George H. Allen
By
atty.

UNITED STATES PATENT OFFICE.

GEORGE HAMILTON ALLEN, OF NORTH FREMANTLE, WESTERN AUSTRALIA, AUSTRALIA.

GENERATOR FOR GAS-PRODUCER PLANTS.

1,254,107.     Specification of Letters Patent.     Patented Jan. 22, 1918.

Application filed July 27, 1915. Serial No. 42,150.

*To all whom it may concern:*

Be it known that I, GEORGE HAMILTON ALLEN, a subject of the King of Great Britain, residing at The State Implement Works, Rocky Bay, North Fremantle, in the State of Western Australia, Commonwealth of Australia, have invented certain new and useful Improvements in Generators for Gas-Producer Plants, of which the following is a specification.

The methods hitherto employed for supplying air to the generating chambers of gas producer plants for the combustion of fuel therein have not been conducive to the even and complete consumption of the same, inasmuch as the outer surfaces only of the mass of fuel receive a sufficient supply of air, while the heart or interior of the mass obtains little or none, with obviously unsatisfactory results.

The object of this invention is therefore to overcome this objection and provide means whereby the heart or interior of the mass of fuel, as well as the outer surface may receive the requisite supply of air, previously heated, for the more complete combustion and even consumption of the fuel, in the process of generating gas, and thereby to improve the quality of the gas produced and to generally increase the efficiency of such appliances.

In carrying my invention into effect I employ one or more air-intakes, ducts or the like to convey heated air to the heart or within the mass of the fuel, such intakes or ducts being so situated that the air in its passage becomes heated and rises therein. Supplementary air inlets or ports, each fitted with a means of controlling its supply of air may also be provided in the wall or walls of the outer shell of the generating chamber in conjunction therewith if desired.

In my preferred form of construction I utilize a cylindrical formation of shell or outer wall and form the air intake or duct in such a manner that it enters the generating chamber in the vicinity of the fire zone and rises centrally and to a convenient height therein. This centrally placed air-intake duct or ducts, preferably of tubular formation, is formed or provided with ports or orifices for the delivery of the heated air which it conveys, and as it terminates beneath the door through which the fuel is fed, it may have a conical shaped end or be provided with a conical shaped cover or the like for the prevention of fuel lodging thereon and for the protection of its ports or orifices.

The accompanying drawings illustrate a cylindrical form of gas producer plant, but I do not confine my invention to this particular design, as I may employ one or more intakes, ducts, or the like, or combination of same, embodying the principle herein described in connection with a gas producer plant of different constructional form.

Figure 1:
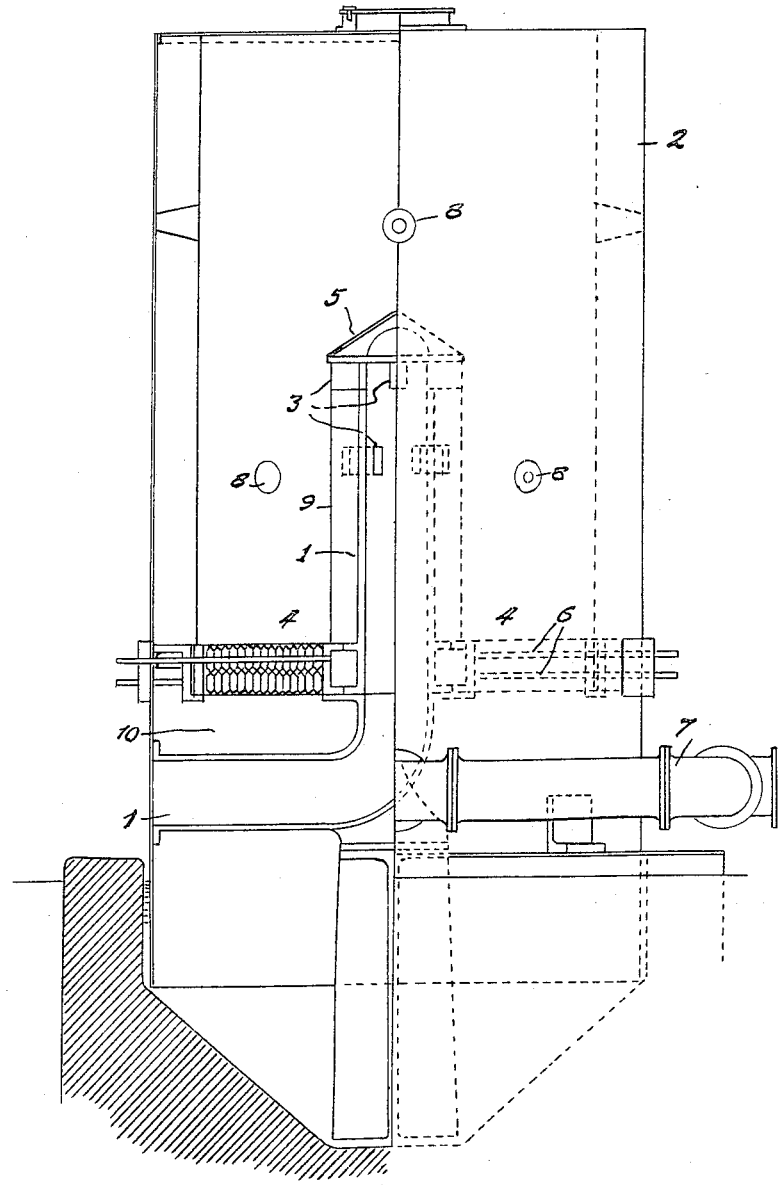
Figure 1 is a partial side elevation and partial vertical section of a preferred type of generator embodying my invention.
Figure 2:
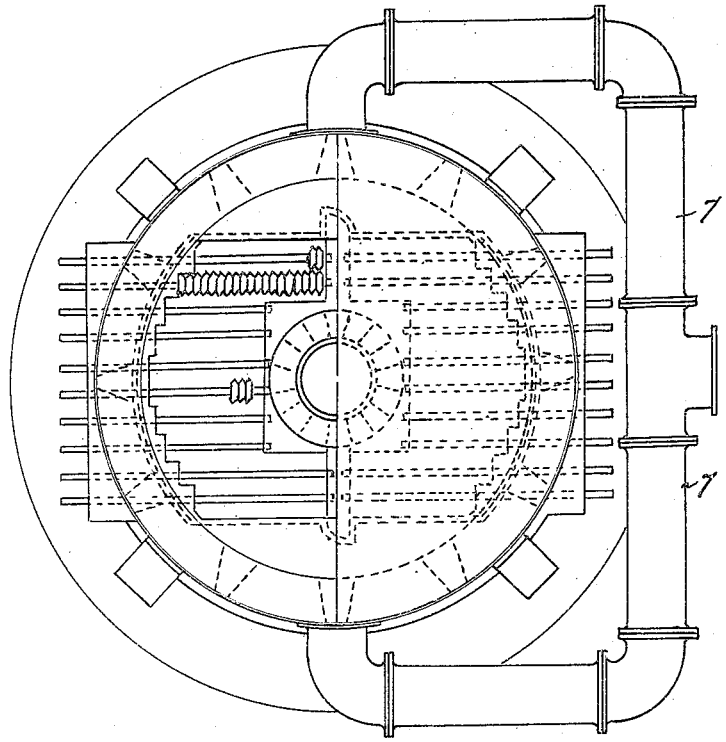
Fig. 2 is a plan view partly in section.
Figure 4:
Fig. 4 is an end view of the tube shown in Fig. 3.

Referring to the drawings:—Fig. 1 is a central vertical section of a preferred type of generator in which 1 is the air-intake or duct centrally positioned in the generating chamber 2. 3 represents the air delivery ports or orifices with which the intake or duct 1 is furnished in different zones. 4 is the fire zone through which the intake or duct 1 passes. 5 is the cap or cover, preferably cone-shaped, for the purpose of distributing the fuel around and about the central core formed by the intake and its protective covering consisting of a plurality of radial longitudinal ribs 9, which also serve to prevent the "coking up" of the fuel by packing against the wall of the air duct, as constantly occurs in generators of the usual form. 6 indicates the fire-bars, beneath which at a suitable distance the suction pipes 7 communicate with the gas chamber 10 of the generator and which may convey the gases to the scrubbers in the ordinary manner. 8 indicates air-inlet ports arranged in different zones in the outer shell or wall of the generating chamber.

Figure 3:
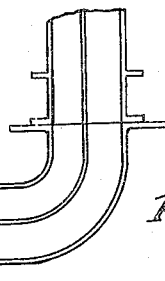
Fig. 3 shows a longitudinal section of a modified form of air inlet tube.

If too much air is introduced into the mass of fuel carbon dioxid, a gas of little value, will be produced. In order to feed uniformly the necessary amount of air throughout the gas forming zone and thereby produce pure carbon monoxid I provide an air inlet tube or pipe such as shown in Fig. 3. This pipe is divided into four separate sections or ducts, $1^a$, $1^d$, $1^c$, and $1^d$, each of which is fitted with a cap valve or other means of controlling its air supply to the section or quarter of the generating chamber with which it communicates for the purpose of maintaining the even combustion or consumption of the fuel surrounding the central tube or pipe, incorporating the separate sections or ducts.

I claim:

1. In a gas producer, a combustion chamber, an air intake extending into the chamber and communicating therewith through laterally arranged ports in the intake, said chamber having supplementary air ports in the outer wall thereof whereby air is supplied to the interior and exterior of the mass of fuel in the chamber and means below the combustion chamber to draw the generated gas through the fuel.

2. In a gas producer, a combustion chamber, an air intake extending centrally into the chamber and communicating therewith through lateral ports arranged in different zones of the intake, said chamber having ports in its outer wall arranged in different zones constituting supplemental air inlets, whereby air is supplied to the interior and exterior of the mass of fuel in the chamber and means below the combustion chamber to draw the generated gas through the fuel.

3. In a gas producer, a combustion chamber, an air conduit passing through the bottom of the chamber and upward into the latter and having ports in different zones through which the conduit communicates with the chamber, radial ribs on the outer periphery of the conduit extending longitudinally thereof, said chamber having supplementary air ports in different zones of its outer wall coöperating with the ports of the conduit to supply air to the interior and exterior of the mass of fuel in the chamber and means below the combustion chamber to draw the generated gas through the fuel.

4. In a gas producer, a combustion chamber, an air conduit passing through the bottom of the chamber, and upward into the latter and having ports in different zones through which the conduit communicates with the chamber, radial ribs on the outer periphery of the conduit extending longitudinally thereof, said chamber having supplementary air ports in different zones of its outer wall coöperating with the ports of the conduit to supply air to the interior and exterior of the mass of fuel in the chamber, a covering for the conduit extending over the ribs and coöperating with the latter to form an air space around the conduit, a gas chamber below the combustion chamber, and suction pipes communicating with the gas chamber to draw the generated gas through the fuel.

5. In a gas producer, a combustion chamber having air ports in its outer wall, and an air conduit having a plurality of separate longitudinal passages passing through the bottom of the chamber and upward into the latter and having ports in different zones through which the passages communicate with the chamber.

6. In a gas producer, a combustion chamber having air ports in its outer wall, an air conduit passing centrally through the bottom of the chamber and upward into the latter, said conduit being divided into separate longitudinal valve controlled passages adapted to supply air to different sections of the chamber through ports arranged in different zones, whereby an even combustion of the fuel around the conduits is maintained.

Dated this 16th day of June, 1915.

In testimony whereof I have hereunto set my hand in presence of the subscribing witnesses.

GEORGE HAMILTON ALLEN.

Witnesses:
W. JOHN,
GRIFFITH GEORGE JOHN,
EDGAR JAMES KENT.

Copies of this patent may be obtained for five cents each, by addressing the "Commissioner of Patents, Washington, D. C."